No. 635,731. Patented Oct. 24, 1899.
F. L. BROWNE & W. T. NORTON.
DEVICE FOR FACILITATING AND ECONOMIZING BUSINESS TRANSACTIONS.
(Application filed July 29, 1899.)
(No Model.)
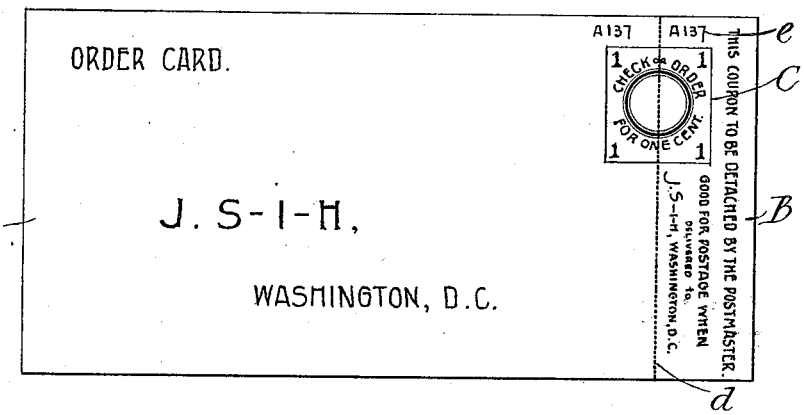
Fig.1.
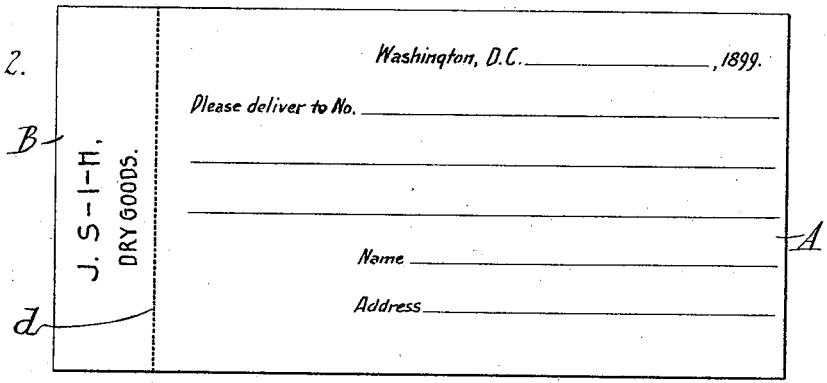
Fig.2.
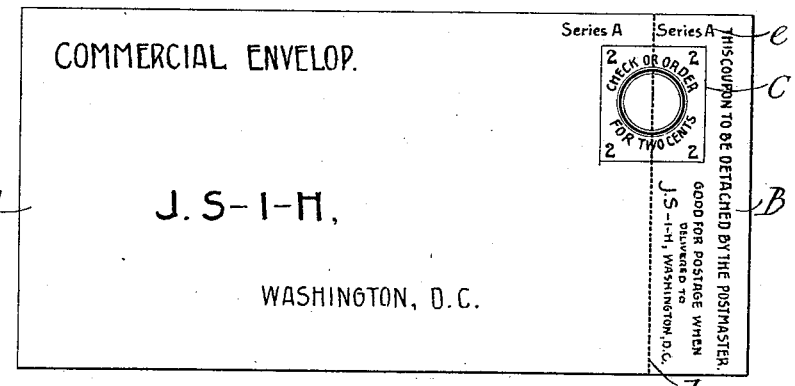
Fig.3.
Fig.4.
Witnesses
K. E. Klein.
J. K. Gedney
Inventors
Frank L. Browne
William T. Norton

UNITED STATES PATENT OFFICE.

FRANK L. BROWNE AND WILLIAM T. NORTON, OF WASHINGTON, DISTRICT OF COLUMBIA.

DEVICE FOR FACILITATING AND ECONOMIZING BUSINESS TRANSACTIONS.

SPECIFICATION forming part of Letters Patent No. 635,731, dated October 24, 1899.

Application filed July 29, 1899. Serial No. 725,538. (No model.)

*To all whom it may concern:*

Be it known that we, FRANK L. BROWNE and WILLIAM T. NORTON, citizens of the United States, residing at Washington, in the District of Columbia, have invented certain new and useful Improvements in Devices for Facilitating and Economizing Business Transactions; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention is directed to improvements in devices for facilitating business transactions and for economizing advertising.

The invention consists of an improved device, such as a card or envelop, having a detachable check or order-stamp printed or otherwise placed across the perforated or weakened line in a manner to insure its cancellation in the separation of the coupon portion and to preserve the indication of value both on such detached portion and the body of the device.

The invention contemplates the use of the device in the issuance of demands for goods, the device being mailed by the dealer to the consumer with instructions to employ it in communicating orders, the card or envelop, as the case may be, being provided with the name and address of the dealer and, in addition, with an order-form for convenience to both parties. The postage-check or order-stamp has denoted upon it an indication of value representing the amount of postage required to send the device through the mails, and said stamp constitutes when the device is delivered to the dealer an order on him for an amount equal to the rate of postage. The consumer, who is the sender of the device, is thus saved the cost of postage, inasmuch as the check or order-stamp is a guarantee that the postage will be assumed by the dealer, and in addition the sender is relieved of the expense of furnishing the card or paper and envelop and of the trouble of ascertaining the name and address of the dealer and addressing the card or envelop. On the other hand, the dealer is by the use of our device saved the expense of purchasing and sending, as is usual, the prepaid card or envelop, which is often put to a different use from that intended.

Our improved device is illustrated in the accompanying drawings.

Figure 1 is a front view of a card, illustrating the invention; Fig. 2, a view of the reverse side of the card; Fig. 3, a front view of an envelop, and Fig. 4 a longitudinal sectional view of the envelop.

Referring to the drawings by letter, A denotes the body of the card or envelop, and B is the coupon portion. On the face side of the card and envelop is the name and address of the dealer, and on the reverse side of the card is an order-form. A sheet containing an order-form may obviously be sent with the envelop. The postage-check or order-stamp is shown at C as extending across the weakened line of separation of the body and coupon, the line being lettered $d$. This stamp is divided, preferably, centrally by the line $d$, and the indication of value is duplicated thereon in order that it may appear both in the body and detached coupon, and thereby avoid confusion.

Numbers or letters, or both, such as indicated at $e$, may be employed as an aid to ascertaining the number of devices issued or as a means for identifying the devices in connection with dealers' specific lines of goods—such as coal-dealers, dry-goods merchants, &c.

The device, as before stated, is employed by the consumer in communicating his orders and is mailed by him to the dealer. The postmaster or carrier before delivering the device to the dealer or agent detaches the coupon B and retains same as his voucher, it being understood from the foregoing that the amount of postage due on the device is collected from the dealer, who of course receives and retains the body of the card or envelop bearing the customer's order. The location of the check or order-stamp with reference to the line of separation of the body and coupon results in the preservation of the indication of the rate of postage both to the dealer and postmaster, and the employment of the matter $e$ is a further safeguard against error in the respective accounts. The coupon is preferably provided on its reverse side with the name and occupation of the dealer or agent.

The check or order-stamp may receive the usual marks of cancellation; but they are unnecessary, as the separation of the coupon from the body effectually mutilates the stamp and prevents its reuse, the result being a great saving in time and labor to the post-offices.

We claim as our invention—

1. A device of the character specified consisting of an envelop or card provided with a coupon portion separable from the body portion on a weakened line which is at a predetermined distance from the edge of the coupon, and provided with the described postage-check or order-stamp printed or otherwise placed across the perforated line and having matter indicating an amount equal to a rate of postage at each side of such weakened line, whereby a portion of said stamp is severed with the coupon to be presented to the holder of the body portion for comparison and collection.

2. A device of the character described consisting of an envelop or card provided with a coupon portion separable by hand from the body portion on a perforated line which is at a predetermined distance from the edge of the coupon, and provided with a postage-check or order-stamp printed or otherwise placed also at a distance from the edge of said coupon and across the perforated line, whereby a space is left for printed matter on said coupon and a portion of said stamp is severed with the same to be presented to the holder of the body portion for comparison and collection.

3. A device of the character specified consisting of an envelop or card having a body portion and a coupon portion which constitutes a voucher and is separable from the body portion on a weakened line, and provided with a token constituting an order on a postage account said token being across the weakened line and having on its separable parts corresponding indications of the amount of postage to be collected, whereby a part of the token with its indication is severed with the voucher, as and for the purpose set forth.

In testimony whereof we affix our signatures in presence of two witnesses.

FRANK L. BROWNE.
WILLIAM T. NORTON.

Witnesses:
ARTHUR BROWNING,
J. K. GEDNEY.